United States Patent
Williamson et al.

(10) Patent No.: US 10,600,527 B1
(45) Date of Patent: Mar. 24, 2020

(54) CERAMIC WASTE FORM PRODUCTION FROM USED NUCLEAR FUEL

(71) Applicant: Energy, United States Department of, Washington, DC (US)

(72) Inventors: Mark A. Williamson, Naperville, IL (US); James L. Willit, Batavia, IL (US); Stanley G. Wiedmeyer, Glen Ellyn, IL (US); Terry R. Johnson, Wheaton, IL (US); Javier Figueroa, Andover, KS (US)

(73) Assignee: U.S Department of Energy, Washington, DC (US)

(*) Notice: Subject to any disclaimer, the term of this patent is extended or adjusted under 35 U.S.C. 154(b) by 0 days.

(21) Appl. No.: 16/127,611

(22) Filed: Sep. 11, 2018

(51) Int. Cl.
   *G21F 9/30* (2006.01)
   *G21F 9/00* (2006.01)
   *C03C 3/089* (2006.01)
   *C04B 35/19* (2006.01)

(52) U.S. Cl.
   CPC .............. *G21F 9/304* (2013.01); *G21F 9/007* (2013.01); *G21F 9/008* (2013.01); *G21F 9/305* (2013.01); *C03C 3/089* (2013.01); *C04B 35/19* (2013.01)

(58) Field of Classification Search
   CPC . G21F 9/30; G21F 9/304; G21F 9/007; G21F 9/008; G21F 9/305; C03C 3/089; C04B 35/19
   USPC .......................................................... 588/18
   See application file for complete search history.

(56) References Cited

U.S. PATENT DOCUMENTS

| | | | | |
|---|---|---|---|---|
| 2016/0027544 A1* | 1/2016 | Itou | ................. | G21F 9/305 588/11 |
| 2016/0189815 A1* | 6/2016 | Boen | ................. | F23G 5/085 110/346 |

* cited by examiner

*Primary Examiner* — Edward M Johnson
(74) *Attorney, Agent, or Firm* — Felisa L. Leisinger; Michael J. Dobbs; Brian J. Lally

(57) ABSTRACT

According to one aspect of the invention, a method to create a ceramic waste form from used nuclear fuel. An active metal salt waste, a rare earth metal waste, and raw materials are received. The active metal salt waste is combined with the rare earth metal waste, forming a waste salt. The waste salt is then heated to approximately 500° C. The raw materials are also heated to approximately 500° C. The waste salt and raw materials are then blended to form a homogenous waste mixture. The homogenous waste mixture is heated to a first predetermined temperature for a predetermined amount of time, creating a ceramic waste form. The ceramic waste form is cooled to a second predetermined temperature.

18 Claims, 4 Drawing Sheets
(1 of 4 Drawing Sheet(s) Filed in Color)

US 10,600,527 B1

CERAMIC WASTE FORM PRODUCTION FROM USED NUCLEAR FUEL

GOVERNMENT INTERESTS

The United States Government has rights in this invention pursuant to Contract No. DE-AC02-06CH11357 between the U.S. Department of Energy (DOE) and UChicago Argonne, LLC.

FIELD OF THE INVENTION

The present invention relates to ceramic waste form production.

BACKGROUND OF THE INVENTION

A common approach to manage active metal salt waste from the electrochemical pyroprocessing of used nuclear fuel is to immobilize the spent electrolyte salt containing oxidized fission products into a borosilicate glass waste form. Though, borosilicate glass waste forms are known to degrade over time. One factor for degradation is the amount of chloride ions contained in active metal salt waste. Chloride ions degrade the performance, and safety, of the borosilicate glass. Therefore, there is a need for a pyroprocessing method that accounts for the significant number of chloride ions found in electrolyte salt waste from electrochemical processing that overcomes the degradation problems caused by chloride ions in long term storage of separated fission product chlorides and residual actinide chlorides from used nuclear fuel.

SUMMARY OF THE INVENTION

According to one aspect of the invention, a method to create a ceramic waste form from used nuclear fuel. In some described examples, an active metal salt waste, a rare earth metal waste, and raw materials are received. The active metal salt waste is combined with the rare earth metal waste, forming a waste salt. The waste salt is then heated to approximately 500° C. The raw materials are also heated to approximately 500° C. The waste salt and raw materials are then blended to form a homogenous waste mixture. The homogenous waste mixture is heated to a first predetermined temperature for a predetermined amount of time, creating a ceramic waste form. The ceramic waste form is cooled to a second predetermined temperature.

In some examples of the method, the active metal salt waste includes active metal and divalent rare earth fission products, the divalent rare earth fission products include samarium and europium, and the active metal fission products include alkali and alkaline earth elements as well as residual amounts of actinide elements present as chlorides. In further examples of the method, the active metal salt waste includes sodalite.

According to another aspect of the invention, a method to create a ceramic waste form from used nuclear fuel. An active metal salt waste, a rare earth metal waste, and raw materials are received. The active metal salt waste is combined with the rare earth metal waste, forming a waste salt. The waste salt is then heated to approximately 500° C. The raw materials are also heated to approximately 500° C. The waste salt and raw materials are blended in a ceramic waste blender to form a homogenous waste mixture. The homogenous waste mixture is placed into a waste canister and then conveyed to a ceramic waste furnace. The homogenous waste mixture is heated to a first predetermined temperature for a predetermined amount of time, creating a ceramic waste form within the waste canister. The ceramic waste form is conveyed through at least two cooling zones to cool the ceramic waste form to a second predetermined temperature.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention are illustrated in the accompanying figures where.

DETAILED DESCRIPTION OF THE INVENTION

The following detailed description provides illustrations for embodiments of the present invention. Those skilled in the art will recognize that other embodiments for carrying out or practicing the present invention are also possible.

Figure 1:
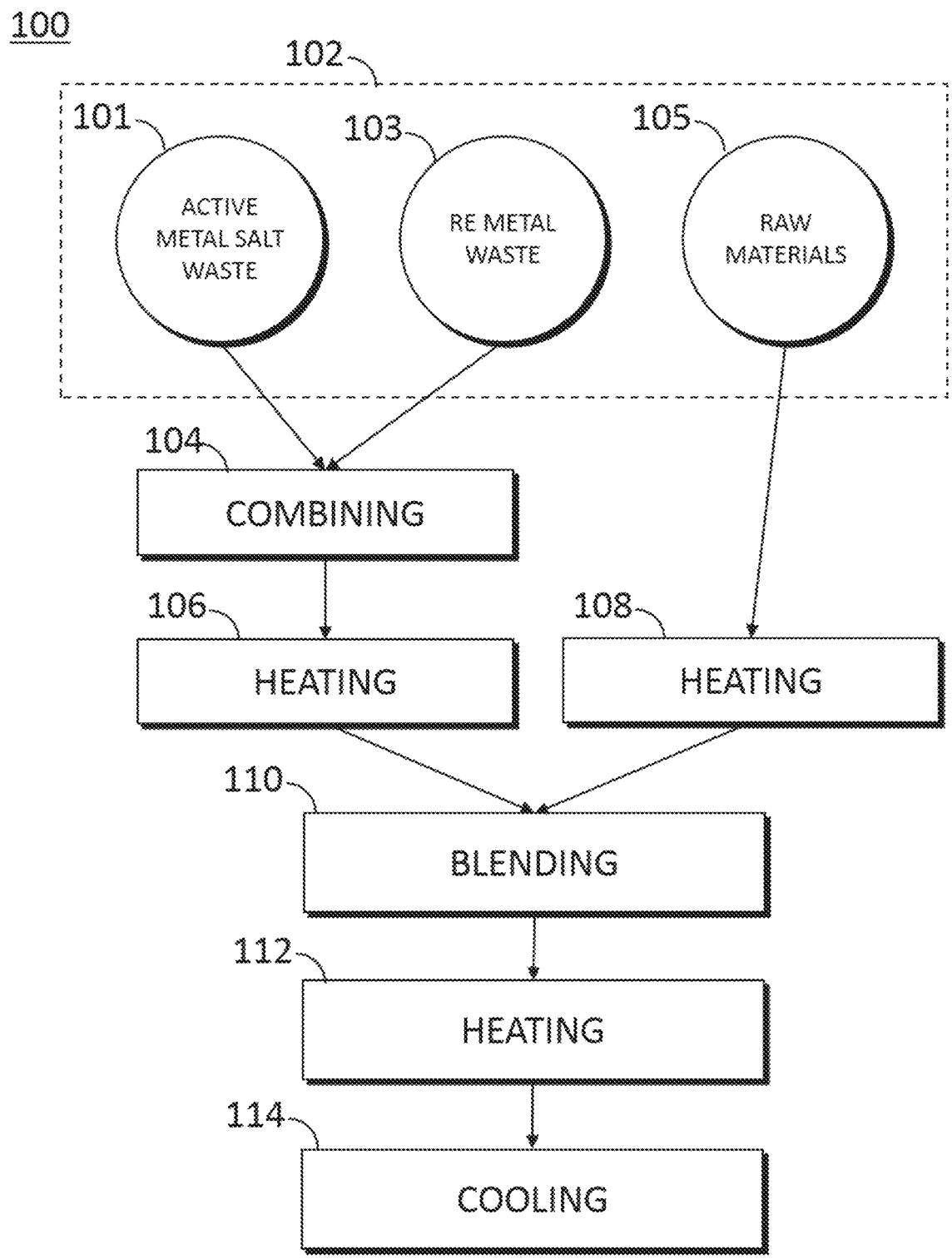
FIG. 1 is a flowchart illustrating a method according to an embodiment of this invention.

The present invention overcomes prior art by producing a ceramic waste form, as is necessary to account for a significant number of chloride ions found in nuclear waste from electrochemical processing. FIG. 1 is a flowchart illustrating an example method to create a ceramic waste form from electrolyte salt discharged from a used nuclear fuel processing system. The method 100 stabilizes active used nuclear fuel metals in a ceramic waste form for high-level waste disposal.

Method 100 creates a ceramic waste form from used nuclear fuel. The method 100 receives 102 active metal salt waste 101, rare earth metal waste 103, and raw materials 105. The active metal salt waste 101 is radioactive metal waste derived from used nuclear fuel, used nuclear fuel cladding, noble metals, rare earth metals, and waste salt, or combinations thereof, containing active metal fission products present as ions in the active metal salt waste 101 and solids in the rare earth metal waste 103. The used nuclear fuel may be used light water reactor (LWR) fuel or fast reactor fuel. The used nuclear fuel may have undergone additional processing, for example, electrorefining, prior to being treated by the method 100. The active metal salt waste 101 can contain active metal (e.g., alkali and alkaline earth elements) and divalent rare earth fission products. The divalent rare earth fission products may be samarium and europium. The active metal salt waste 101 can be derived from treating used nuclear fuel with a pyrochemical process. For example, the active metal salt waste 101 can be made from alkali and alkaline earth fission product elements accumulated from electrofining processes that collect uranium and transuranic elements for recycle from a used nuclear fuel assembly. Table 1 shows an exemplary makeup of an active metal salt waste 101 made from treating used LWR fuel.

TABLE 1

| Active Metal Waste Per Assembly | | |
| --- | --- | --- |
| Species | As recovered (kg) | Metal (kg) |
| LiCl | 4.7 | n/a |
| Divalent Rare Earths | 0.9 | 0.6 |
| Active Metal Chlorides | 4.6 | 3.2 |
| Total | 10.2 | 3.8 |

Unlike prior art methods of nuclear waste management where fission products are encapsulated in a borosilicate glass prior to disposal in a high-level waste repository, the method 100 uses an aluminosillicate-based ceramic that results in the formation of sodalite. The active metal salt waste 101 contains a significant amount of chloride ions; therefore, prior art borosilicate glass is not the preferred disposal matrix because the chloride ions degrade the performance, and safety, of the glass. Thus, sodalite, a naturally occurring mineral containing chloride, is the preferred matrix for the disposal of active metal salt waste 101 from the used nuclear fuel pyrochemical process of method 100.

The rare earth metal waste 103 is derived from rare earth metals captured or collected from used nuclear fuel recycling or processing. For example, the rare earth metal waste 103 could originate from rare earth metal deposited on cathodes derived from electrochemical processing of used nuclear fuel. The rare earth metal waste 103 may contain trace quantities of actinide metals from the used nuclear fuel process. In addition, rare earth waste 103 could be derived from rare earth ions present in chloride salt that are collected and disposed along with the alkali and alkaline earth chlorides The raw materials 105 include borosilicate glass and zeolite. The amount of zeolite used is enough to encapsulate at least 50% of the chloride anions in the waste salt in sodalite cages with a ratio of chloride ions to sodalite cages of greater than 3.0. In an embodiment, at least 90% of the chloride anions are encapsulated with a ratio of, at least, 3.8 of chloride ion to sodalite cages. In an embodiment, 760 kg of zeolite and 250 kg of borosilicate glass are used. The zeolite must be Type A, be fully activated, sodium-form with 10% clay binder, be between 1.6-2.5 mm diameter round beads, with a water content of less than approximately 0.1 wt %. The weight ratio of glass to zeolite must be 0.30 to 0.35. A typical glass composition is $SiO_2$ 70%; $B_2O_3$ 22%; $Al_2O_3$ 2.5%; $Na_2O+K_2O$ 6%.

The active metal salt waste 101 and rare earth metal waste 103 are then combined 104 to form a waste salt. The waste salt can be a liquid waste salt-solid rare earth metal slurry or it can be a solid waste salt-solid rare earth mixture. The combining step 104 may be accomplished by mixing the active metal salt waste 101 and rare earth metal waste 103. The mixing can occur in a transport tank with a magnetic stirrer. For example, the combining step 104 can be accomplished in a tank adapted with a magnetic stirrer from the outside of the tank that drives a magnetic bar inside the tank. The active metal salt waste 101 and rare earth metal waste 103 are considered to be combined 104 when the waste salt is able to be processed into a ceramic waste form. In an embodiment, the combining step 104 is accomplished by mixing the active metal salt waste 101 and rare earth metal waste 103 in a transport tank, creating a waste salt.

The waste salt is heated 106 until it melts. The heating 106 can be accomplished through any means capable of melting the waste salt to between approximately 400-660° C. For example, it is accomplished through the use of heater rods surrounding the waste salt. Or, the heating 106 is accomplished by surrounding the waste salt in another vessel adapted with a heating element. In an embodiment, the waste salt is heated 106 in a waste salt transport tank. In other embodiments, the waste salt is heated 106 with at least one heater rod placed in proximity to the route the waste salt takes as the waste salt travels through a ceramic waste form production system.

The next step is to heat 108 the raw materials 105. The heating 108 can be accomplished through any means capable allowing the raw materials 105 to achieve temperatures between approximately 400-660° C. For example, it is accomplished through the use of heater rods surrounding the raw materials 105. Or, the heating 108 is accomplished by surrounding the raw materials 105 in another vessel suitable for heating. In an embodiment, the raw materials 105 are heated 108 in a ceramic waste blender. In other embodiments, the raw materials 105 are heated 108 with at least one heater rod placed in proximity to the route the raw materials 105 take as the raw materials 105 travel through a ceramic waste form production system.

Next, the waste salt and raw materials 105 are blended 110 to form a homogenous waste mixture. To blend 110, the waste salt can be added to the container the raw materials 105 are in, or the raw materials 105 can be added to the container the waste salt is in. Alternatively, the raw materials 105 and waste salt can be blended 110 by pouring them into a different container. The blending 110 can be accomplished by transferring the waste salt into a ceramic waste blender that contains the raw materials 105. The transfer can be through a pneumatic process or any process that adds the waste salt to the raw materials 105. For example, the waste salt can be sprayed into a ceramic waste blender where the raw materials 105 are already present. The transfer of the waste salt into the raw materials 105 could take minutes to days. For example, the transfer could take approximately 10 minutes or approximately 36 hours.

Figure 2:
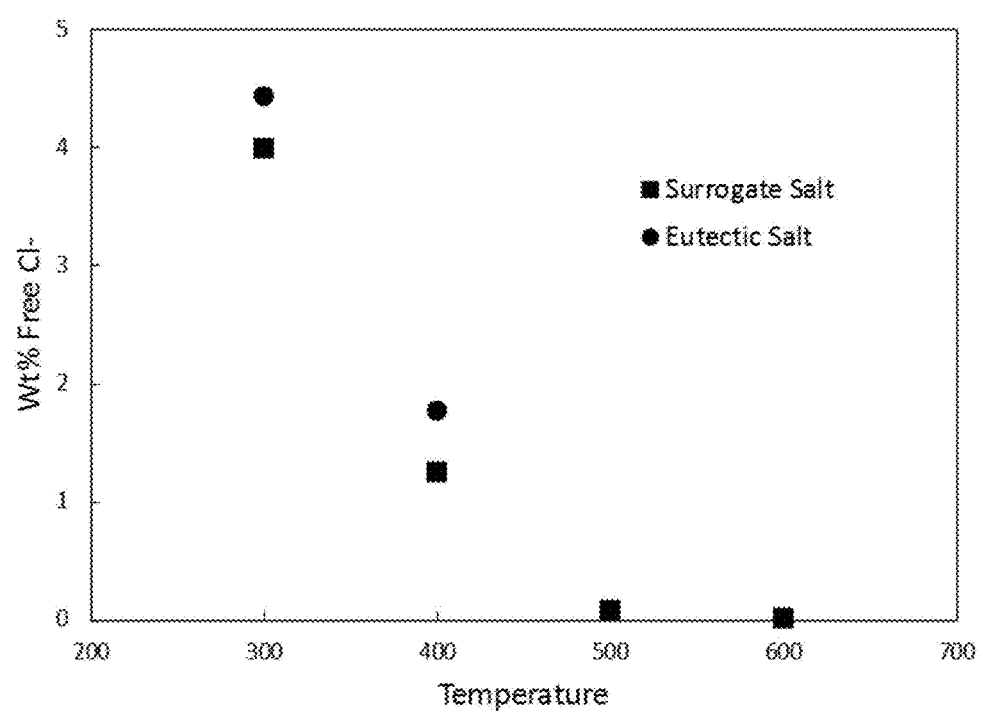
FIG. 2 illustrates the effect of temperature on LiCl—KCl sorption in zeolite-4A with 24-hour hold times.

The blending 110 is complete when the chloride anions of the waste salt are occluded in a zeolite cage, creating a homogenous waste mixture. Salt cations are either occluded in the zeolite or dissolved in the glass matrix as oxides. Sufficient water can be added to oxidize the rare earth metals with the resulting oxides dissolved in the glass. At 650° C. and above, zeolite decomposes to an aluminosilicate without a molecular cage. Below 650° C., chloride ions in molten salt are occluded at rates that increase with increasing temperature and decreasing zeolite particle size. The effect of temperature on LiCl—KCl Sorption in Zeolite-4A with 24 hour hold times is illustrated in FIG. 2. Solid zeolite and salt were blended and then heated in a laboratory-scale V-mixer. "Free Chloride" was the chloride ions not occluded in the zeolite cage as measured by their percent of the total weight of zeolite and salt. A free chloride content of about 0.5% of the zeolite weight is acceptable because the glass-zeolite matrix can dissolve about that amount of halides.

Figure 3:
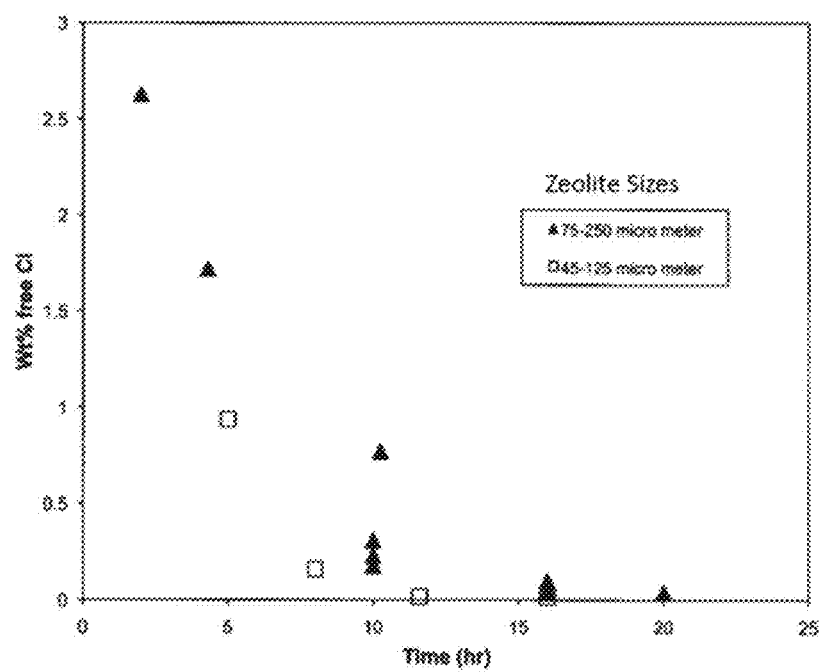
FIG. 3 illustrates the effect of zeolite particle size on chloride ion occlusion from LiCl—KCl at 500° C.

The effect of particle size is shown in FIG. 3. Zeolite particles, contained within the raw materials 105, were mixed at 500° C. in a laboratory-scale V-blender with LiCl—KCl-based salt. Extrapolating these data to the specified zeolite size (1000 to 2000 microns), it is estimated that acceptable free chloride contents can be reached within 3 days when waste salt is sprayed onto well-mixed, preheated raw materials at 500° C. to 550° C. After chloride anions of the active metal salt waste 101 have been occluded into zeolite of the raw materials 105, the homogenous mixture is formed.

Then, the homogenous mixture is heated 112 to a first predetermined temperature for a predetermined amount of time creating a ceramic waste form. The first predetermined temperature is any temperature sufficient to melt any solidified salt in waste salt into a ceramic waste form. The first predetermined temperature can range between approximately 500° C. and 1,000° C. For example, the first predetermined temperature is between approximately 900-950° C.

The predetermined amount of time the homogenous mixture is heated 112 is the time it takes to create a ceramic waste form at the first predetermined temperature. In the example where the first predetermined temperature is between approximately 900-950° C., the heating 112 is carried out over the course of approximately 3 to 4 days.

At a temperature between about 800° C. and 850° C., the salt and zeolite 4A react to form sodalite following the net reaction:

$$Na_{12}(AlSiO_4)_{12}(s)+4NaCl(l)=2Na_8(AlSiO_4)_6Cl_2(s) \quad (1)$$

The ceramic waste form includes the homogenous mixture in a glass-bonded sodalite (ceramic) waste form. The functional role of the sodalite is to accommodate chloride ions from the salt and the primary role of the glass is to encapsulate the sodalite. The glass, which contains $Na_2O$, can react to exchange sodium for other alkali metals in the salt to generate more sodalite. In practice, slightly less than the stoichiometric amount of chloride ion is mixed with the zeolite to minimize the amount of non-occluded salt that remains after blending. The processing range of salt loading is 3.4-3.9 chloride ion per pseudo unit cell of the zeolite, with a target of 3.9. A sub-stoichiometric amount of NaCl leads to the formation of small amounts of nepheline according to the net reaction $$Na_{12}(AlSiO_4)_{12}(s)+3.8NaCl(l)=1.90Na_8(AlSiO_4)_6Cl_2(s)+0.15Na_4(AlSiO_4)_4(s) \quad (2)$$

Sodalite can also decompose to form nepheline and halite as $$Na_8(AlSiO_4)_6Cl_2(s)=1.5Na_4(AlSiO_4)_4(s)+2NaCl(s) \quad (3)$$

The formation of small amounts of nepheline is not detrimental to waste form durability. Alkali metals and alkaline earth cations in the salt are dissolved into the glass. However, high concentrations of CsCl react with the zeolite and silica from the glass to form pollucite and halite as:

$$Na_{12}(AlSiO_4)_{12}(s)+12CsCl(l)+12SiO_2(s)=12CsAlSi_2O_6(s)+12NaCl(l) \quad (4)$$

A stoichiometric combination of the reactions to form sodalite and pollucite gives:

$$4Na_{12}(AlSiO_4)_{12}(s)+12CsCl(l)+12SiO_2(s)=6Na_8(AlSiO_4)_6Cl_2(s)+12CsAlSi_2O_6(s) \quad (5)$$

The vast majority of radionuclides are either dissolved in the binder glass or present in small inclusion phases distributed throughout the glass. Most of the iodine inventory is in sodalite, but sodalite does not contain measurable amounts of other radionuclides. A small fraction of the iodine inventory and trace amounts of cesium are incorporated into the halite phases. Similar fractions of iodide in the salt can substitute for chloride ions in sodalite and halite. The small amount of residual water present in zeolite 4A is sufficient to oxidize rare earths present in the waste to form mixed oxides during the salt loading step. Those particles migrate into the molten glass during processing and remain as oxide inclusions in the waste form. Residual actinides contained in the waste salt behave similarly by partitioning to the glass as an oxide phase.

The release of all radionuclides (except iodide from sodalite) is controlled by durability of the binder glass, either directly as the glass dissolves or indirectly as the host phases become exposed to water as the glass dissolves. Halite inclusions dissolve immediately when contacted by water and oxide inclusion phases are released as colloids as the surrounding glass dissolves.

The active metal salt waste loading in the ceramic waste form depends on both the stoichiometry of the reaction between NaCl and zeolite 4A to generate sodalite and the need to encapsulate the sodalite with binder glass. The amount of chloride (and iodide) that can be sequestered in sodalite is limited by the equal amount of sodium ions needed to generate the sodalite based on the stoichiometry in Equation 1. Although other cations in the salt are not accommodated in sodalite, they can exchange with sodium in the glass to generate more sodalite. The presence of sub-stoichiometric amounts of chloride ion leads to the formation of nepheline, whereas the presence of excess chloride ion leads to the formation of halite inclusions. Small amounts of halite form in moderately sub-stoichiometric mixtures due to the incomplete conversion of zeolite to sodalite or its degradation. Pragmatically, the salt loading is limited by the tolerance to halite inclusions in the final waste form. Small amounts of halite are not detrimental to the chemical, radiological, or physical durability of the waste form. It is expected that suitable ceramic waste forms can be made with halite contents up to the point where the material loses its physical integrity. The formation of halite appears to depend on the availability of sodium. The distribution of iodide between sodalite and halite mirrors the distribution of chloride. Although small amounts of cesium have been detected in halite, inclusions of CsCl were not observed in waste forms made with CsCl. Inclusions of LiCl have not been observed, and lithium was not detected as contaminants in halite.

The phase assemblages and durabilities of ceramic waste form materials made with active metal waste salt loadings between 5% and 15% (in the salt-loaded zeolite) and binder glass, in the raw materials, additions between 20% and 30% have been evaluated. Materials made with the highest salt loadings (up to 11 mass %) and the least binder glass (20%) had acceptable chemical durability. The salt composition will affect the waste loading. For example, 3 moles of CsCl require 1 moles of zeolite 4A to sequester the cesium ion in pollucite and 1 moles of zeolite 4A to sequester the chloride ion in sodalite, and more glass will be required to encapsulate the products. Salt waste streams with low sodium ion contents may require the addition of NaCl to produce enough sodalite to accommodate the chloride ion.

Following the heating 112 of the homogeneous mixture, the ceramic waste form cools 114 to a second predetermined temperature. Cooling 114 can be accomplished through natural convection or forced cooling mechanisms, such as blowers. In an embodiment, cooling zones are used to cool 114 the ceramic waste form. The second predetermined temperature is at most, approximately, 600° C.; however can range between approximately 150° C. and 600° C. The cooling 114 of the ceramic waste form can be slow, to prevent the waste form from cracking.

Figure 4:
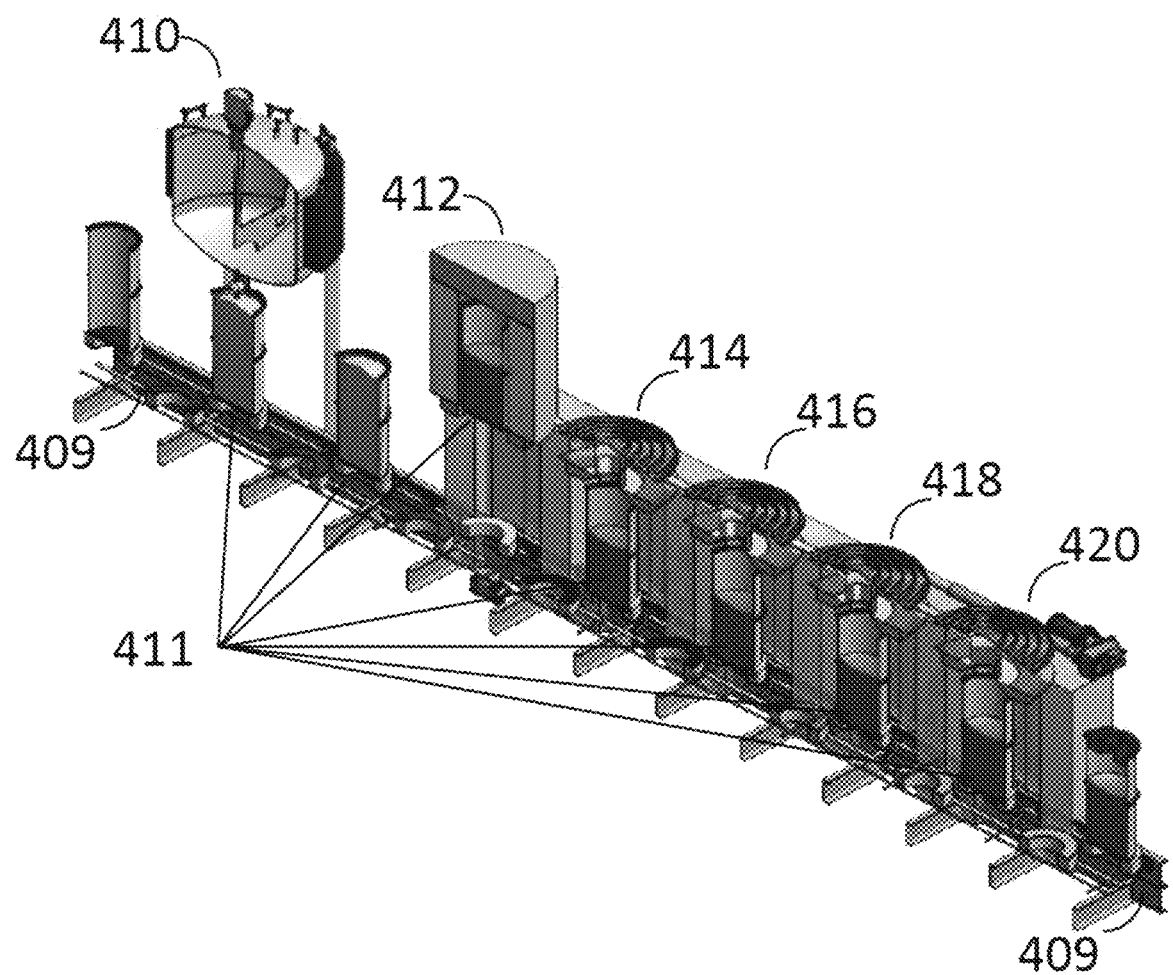
FIG. 4 illustrates the integrated processing line for ceramic waste form fabrication according to an embodiment of this invention.

Referring to FIG. 4, an integrated processing line for ceramic waste form fabrication that includes the blending, heating, and cooling step according to an embodiment of this invention is shown. In this embodiment, after the waste salt and raw materials are heated (not pictured), they are blended 110 into a homogenous waste mixture in a ceramic waste blender 410. The homogenous waste mixture is placed into a waste can 411 that is taken by conveyor 409 to a ceramic waste furnace 412. The waste can 411 is lifted into the furnace 412 and heated 112 to at least approximately 900° C. and held for approximately 24 hours to convert the zeolite to sodalite, melt the glass encapsulating sodalite particles, and produce the ceramic waste form. The waste can 411 is lowered from the ceramic waste furnace 412 and is taken by conveyor 409 to cooling zones 414, 416, 418, and 420 for cooling 114. The first cooling zone 414 cools 114 the ceramic waste form from approximately 900° C. to approximately 600° C. in approximately 24 hours. Over the next, approximately, three days, the waste can 411 is transferred to the remaining cooling zones 416, 418, and 420 where the ceramic waste form is cooled 114 to approximately 400° C.

The method 100 may be iterated to generate a continuous output of ceramic waste forms based upon a continuous input of metal salt waste, rare earth metal waste, and raw materials.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, 6.

The invention claimed is:

1. A method to create a ceramic waste form from used nuclear fuel, the method comprising:
   (a) receiving used nuclear fuel, the nuclear fuel including an active metal salt waste, a rare earth metal waste, and raw materials;
   (b) combining the active metal salt waste and the rare earth metal waste to form a waste salt;
   (c) heating the waste salt to between approximately 400-660° C.;
   (d) heating the raw materials to between approximately 400-660° C.;
   (e) blending the waste salt and raw materials to form a homogenous waste mixture;
   (f) heating the homogenous waste mixture to a first predetermined temperature for a predetermined amount of time, creating a ceramic waste form; and
   (g) cooling the ceramic waste form to a second predetermined temperature.

2. The method of claim 1, wherein the raw materials comprise zeolite and borosilicate glass.

3. The method of claim 1, wherein the raw materials comprise approximately 760 kg of zeolite and approximately 250 kg of borosilicate glass.

4. The method of claim 1, wherein the active metal salt waste comprises active metal and divalent rare earth fission products.

5. The method of claim 4, wherein the divalent rare earth fission products comprise samarium and europium.

6. The method of claim 4, wherein the active metal fission products comprise alkali, alkaline earth and actinide elements.

7. The method of claim 1, wherein the active metal salt waste comprises sodalite.

8. The method of claim 1, wherein the step of combining the active metal salt waste and rare earth metal waste includes the sub steps of:
   (a) combining the active metal salt waste salt and the rare earth metal waste in a transport tank; and
   (b) heating the active metal salt waste and the rare earth metal waste in a transport tank.

9. The method of claim 1, wherein the raw materials are heated in a ceramic waste blender.

10. The method of claim 1, wherein the step of blending the waste salt and raw materials includes the sub step of:
    (a) blending the waste salt and raw materials for approximately three to four days.

11. The method of claim 1, wherein the step of blending waste salt and raw materials includes the sub step of:
    (a) maintaining the waste salt and raw materials at a temperature between approximately 500-600° C.

12. The method of claim 1, wherein the first predetermined temperature is between approximately 900-950° C.

13. The method of claim 1, wherein the predetermined amount of time is between approximately three to four days.

14. The method of claim 1, wherein the second predetermined temperature is between approximately 150-600° C.

15. The method of claim 1, wherein the step of cooling occurs in incremental cooling zones, each cooling zone cooling the ceramic waste form to a lower temperature.

16. The method of claim 1, further comprising repeating steps (a) through (g) to generate an integrated process for the continuous output of ceramic waste forms based upon a continuous input of metal salt waste, rare earth metal waste, and raw materials.

17. A method to create a ceramic waste form from used nuclear fuel, the method comprising:
    (a) receiving used nuclear fuel, the nuclear fuel including an active metal salt waste, a rare earth metal waste, and raw materials;
    (b) combining the active metal salt waste and the rare earth metal waste to form a waste salt;
    (c) heating the waste salt to approximately 500° C.;
    (d) heating the raw materials to approximately 500° C.;
    (e) blending the waste salt and raw materials in a ceramic waste blender to form a homogenous waste mixture;
    (f) placing the homogenous waste mixture into a waste canister;
    (g) conveying the waste canister to a ceramic waste furnace;
    (h) heating the homogenous waste mixture to a first predetermined temperature for a predetermined amount of time, creating a ceramic waste form within the waste canister; and
    (i) conveying the canister through at least two cooling zones to cool the ceramic waste form to a second predetermined temperature.

18. The method of claim 17, further comprising repeating steps (a) through (i) to generate an integrated process for the continuous output of ceramic waste forms based upon a continuous input of metal salt waste, rare earth metal waste, and raw materials.

* * * * *